(12) United States Patent
Stafford et al.

(10) Patent No.: US 8,509,853 B1
(45) Date of Patent: Aug. 13, 2013

(54) DYNAMIC SCROLLING-TICKER FOR INITIATING TELECOMMUNICATIONS SERVICES

(75) Inventors: Matthew Wayne Stafford, Austin, TX (US); Mark Steven Wuthnow, Austin, TX (US); William Patrick Coan, Monroe, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 910 days.

(21) Appl. No.: 11/504,132

(22) Filed: Aug. 14, 2006

(51) Int. Cl.
| | |
|---|---|
| *H04M 3/42* | (2006.01) |
| *H04M 11/00* | (2006.01) |
| *H04W 4/00* | (2009.01) |
| *H04B 1/38* | (2006.01) |
| *H04B 1/56* | (2006.01) |
| *G01R 31/08* | (2006.01) |
| *G06F 11/00* | (2006.01) |
| *G06F 3/048* | (2006.01) |
| *G06F 15/16* | (2006.01) |
| *G06F 3/14* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/16* | (2006.01) |
| *H04L 5/14* | (2006.01) |
| *H04Q 11/00* | (2006.01) |
| *G06Q 30/00* | (2012.01) |
| *H04N 7/10* | (2006.01) |
| *H04N 7/025* | (2006.01) |

(52) U.S. Cl.
USPC ........ 455/566; 455/414.1; 455/416; 455/466; 370/230; 370/260; 370/330; 379/88.22; 705/14.41; 709/204; 709/230; 715/774; 715/864; 725/34

(58) Field of Classification Search
USPC ................. 455/41.2, 412.2, 414.1, 466, 518, 455/566, 416, 419, 459, 507, 564, 567, 525; 370/329, 235, 330; 709/230, 203, 204; 715/738, 774, 748, 785, 831, 854, 864, 744, 715/745; 725/135, 136
See application file for complete search history.

(56) References Cited

U.S. PATENT DOCUMENTS

| | | | | |
|---|---|---|---|---|
| 5,592,478 | A * | 1/1997 | Weiss | 370/260 |
| 6,147,981 | A * | 11/2000 | Prescott | 370/318 |
| 6,606,493 | B1 * | 8/2003 | Chow et al. | 455/414.1 |
| 6,727,930 | B2 * | 4/2004 | Currans et al. | 715/864 |

(Continued)

*Primary Examiner* — Andrew Wendell
*Assistant Examiner* — Paul P Tran
(74) *Attorney, Agent, or Firm* — Woodcock Washburn LLP

(57) ABSTRACT

A system and method for initiating communications between a first wireless device and a second wireless device. The method includes the steps of detecting the status of the first wireless device, notifying the second wireless device via a scrolling ticker message based on the detecting step and establishing a communication session between the first and second wireless devices. The detecting step includes generating an alert based on a predefined event. The system for establishing a communication path between a first mobile device and a second mobile device includes an IMS core, a presence server communicatively coupled to the IMS core and in communication with the first mobile device, a scrolling ticker server in communication with the presence server and with the second mobile device, wherein the presence server communicates availability of the first mobile device and the scrolling ticker notifies the second mobile device of the availability of the first mobile device.

15 Claims, 4 Drawing Sheets

(56) References Cited

U.S. PATENT DOCUMENTS

| | | | |
|---|---|---|---|
| 6,742,042 B1* | 5/2004 | Holden et al. | 709/230 |
| 7,120,455 B1* | 10/2006 | Chen et al. | 455/466 |
| 7,167,728 B1* | 1/2007 | Wagner et al. | 455/566 |
| 7,315,747 B2* | 1/2008 | Klassen et al. | 455/466 |
| 7,664,814 B2* | 2/2010 | Little, II | 709/204 |
| 8,194,837 B1* | 6/2012 | Weinman | 379/201.01 |
| 2001/0024951 A1* | 9/2001 | Rignell et al. | 455/414 |
| 2003/0018704 A1* | 1/2003 | Polychronidis et al. | 709/202 |
| 2003/0026289 A1* | 2/2003 | Mukherjee et al. | 370/466 |
| 2003/0119540 A1* | 6/2003 | Mathis | 455/518 |
| 2004/0015548 A1* | 1/2004 | Lee | 709/204 |
| 2004/0172384 A1* | 9/2004 | Koll | 707/3 |
| 2005/0039135 A1* | 2/2005 | Othmer et al. | 715/774 |
| 2005/0068905 A1* | 3/2005 | Dorner et al. | 370/260 |
| 2007/0032194 A1* | 2/2007 | Griffin | 455/41.2 |
| 2007/0232284 A1* | 10/2007 | Mason et al. | 455/416 |
| 2010/0076837 A1* | 3/2010 | Hayes et al. | 705/14.41 |

\* cited by examiner

DYNAMIC SCROLLING-TICKER FOR INITIATING TELECOMMUNICATIONS SERVICES

FIELD OF THE INVENTION

This invention relates to enabling two subscribers of telecommunications services to interact with each other based on notification of availability. More particularly, the invention relates to systems and methods for utilizing an IP Multimedia Subsystem (IMS) in combination with other servers to control peer to peer and other types of communications based on the notification of presence of the subscribers.

BACKGROUND OF THE INVENTION

As new wireless applications continue to be developed, wireless carriers are increasingly looking for methods and systems to more cost effectively provide services to their subscribers and to make those services more convenient and user friendly for those subscribers. Additionally, the provision of content to wireless subscribers continues to be a priority for carriers as subscribers are demanding an ever increasing amount of data and content be available on their wireless devices.

Recently, carriers and vendors of wireless devices have developed systems, methods and wireless devices that deliver content to subscribers in the form of a scrolling ticker which contains headlines, sports scores, stock information, or other data on a portion of the display screen. For example, such systems are commercially available on Motorola wireless device model V557 and available to subscribers of Cingular Wireless, the assignee of the present invention.

As part of the 3GPP standards, cellular and other telecommunication providers are deploying IP Multimedia Subsystems ("IMS"), a next generation network that uses the IP protocol to control the set-up and transport of data. The IMS supports data, video, SIP-based voice over IP (VoIP) and non-SIP packetized voice, such as H.323 and MGCP. IMS integrates with the public switched telephone network and provides traditional telephony services such as 800 numbers, caller ID and local number portability to wireless subscribers. IMS also supports instant messaging, push-to-talk, video conferencing and video on demand applications. Moreover, IMS provides a framework to enable peer-to-peer services among wireless users.

Finally, wireless providers have developed presence services to dynamically determine the presence and availability of subscribers. Such presence servers often indicate whether a particular subscriber is logged on to a data service and which means of communication are available to that subscriber.

Up until now, each of these technologies has stood alone and therefore have failed to reach their potential in providing cost-effective, user friendly applications to subscribers. Hence, there is a need in the art for systems and methods to integrate and interface the scrolling ticker technology into the IMS subsystem to enable communications using that technology to control or initiate communications services through the IMS subsystem. Moreover, there is a need integrate and interface the scrolling ticker technology with the presence servers as a means for notification of presence to subscribers. As set forth in greater detail below, this invention overcomes those and other needs and provides further advantages to users of telecommunications systems.

BRIEF SUMMARY OF THE INVENTION

The invention satisfies the aforementioned needs in the art by providing systems and methods for initiating communications between a first wireless device and a second wireless device. The method includes the steps of detecting the status of the first wireless device, notifying the second wireless device via a scrolling ticker message based on the detecting step, and then establishing a communication session between the first and second wireless devices. The detecting step includes generating an alert based on a predefined event, wherein the predefined event includes one of powering on the first wireless device, a login to a network or service by the first wireless device, posting of new content by a subscriber, or signing up for new service by a subscriber. The detecting step may be performed periodically or may be requested by the second wireless device. If requested by the second wireless device, the method may include a detecting step that if the first wireless device is busy, the detecting step repeats until it is detected that the second wireless device is no longer busy and then performs the notifying step. The establishing step is performed based on interacting with the second wireless device or may be performed without user intervention. The communication may be a peer-to-peer communication between the first wireless device and the second wireless device, or may be a conference call in which the detecting step determines whether the first wireless device is connected to the conference call.

In accordance with another embodiment of the invention, a method of managing a communication between a wireless device and a telecommunications device by the wireless device is provided. The telecommunications device may be a wireless device or a wireline device. That method includes detecting the availability of the telecommunications device, notifying the wireless device via a scrolling ticker message based on the detecting step, and if the telecommunications device is available, establishing the communication between the wireless device and the telecommunications device. The communication in that embodiment may be a conference call and may include a plurality of telecommunications devices wherein the notifying step is performed each time the detecting step detects a change in participation by one of the plurality of telecommunications devices.

The system of the present invention is a system for initiating a communications path between a first mobile device and a second mobile device including an IMS core, a presence server communicatively coupled to the IMS core and in communication with the first mobile device, a scrolling ticker server in communication with the presence server and with the second mobile device, wherein the presence server communicates availability of the first mobile device and the scrolling ticker notifies the second mobile device of the availability of the first mobile device. The scrolling ticker server may be in communication with the presence server through the IMS core or the scrolling ticker server may be coupled to and in communication with the presense server. The communication path between the first mobile device and the second mobile device is a peer-to-peer communication path.

BRIEF DESCRIPTION OF THE SEVERAL VIEWS OF THE DRAWING

Other features of the invention are further apparent from the following detailed description of the embodiments of the present invention taken in conjunction with the accompanying drawing.

DETAILED DESCRIPTION OF THE INVENTION

Figure 1:
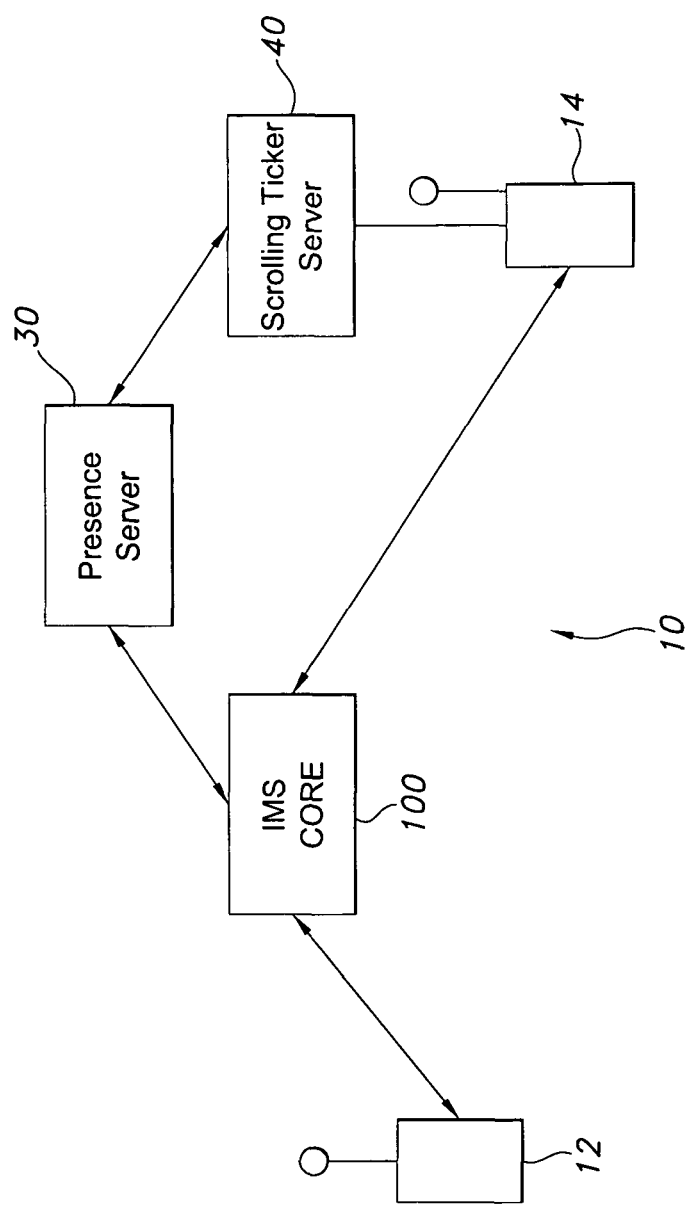
FIG. 1 illustrates a preferred embodiment of a communication network in accordance with the present invention.

Those skilled in the art will recognize that certain acronyms as used herein have industry standard meanings. For the convenience of the reader, the acronyms set forth below shall have the meanings as indicated, or if such acronyms are not listed, they shall have their industry standard meanings.
AS—Application Server
CSCF—Call State Control Functions
P-CSCF—Proxy Call State Control Functions
I-CSCF—Interrogating Call State Control Functions
S-CSCF—Serving Call State Control Functions
HSS—Home Subscriber Server
DNS/ENUM—Provides the link between MSISDN and IP
QoS—Quality of Service
GGSN—Gateway GPRS Support Node
RAN—Radio Access Network
RSS—Really Simple Syndication
SGSN—Serving GPRS Support Node
SDP—Session Description Protocol
SIP—Session Initiation Protocol
UE—User Equipment With reference to FIG. 1, there is shown a functional block diagram of one embodiment of the present invention. There is shown user equipment (UE) 12, 14, which, in accordance with the present invention, are to communicate with each other using peer to peer protocols. Functions included in setting up the peer to peer communication include the IMS core 100, the presence server 30, and the scrolling ticket server 40. The UE 12, 14 may be any type of wireless communication devices, preferably with GPRS data capabilities. At least one of UE 12 or UE 14 supports scrolling ticker technology such as the afore-Mentioned Motorola V577. For the purposes of this description, we will assume that at least UE 14 supports scrolling ticker technology. For convenience, the terms UE and "wireless device" may be used interchangeably throughout this specification.

The presence server 30 is known in the art and is an application server located within the network and preferably designed in accordance with applicable Open Mobile Alliance ("OMA") standards, preferably OMA-ERELD-Presence SIMPLE-VI 0-200602014-C, "Enabler Release Definition for OMA Presence SIMPLE" and references contained therein, all of which are hereby incorporated by reference. The presence server 30 collects information about the presence, or availability, of a set of wireless subscribers. Typically, such information may include, for example, whether a particular subscriber wireless device is powered on and within coverage range, whether the wireless device is accepting data messages or whether the wireless device is otherwise logged on to a particular application such as Instant Messaging. The presence server 30 communicates with the IMS core 100 as one of potentially several application servers.

The scrolling ticker server 40 is preferably a content server configured to communicate with one or more wireless devices, such as UE 12 or UE 14. The scrolling ticker server streams content to wireless devices configured to receive such data. The scrolling ticker server 40 may, for example, provide text streams based on a set of user-defined alerts, such as stock information, sports scores, news, weather, and any other information. One communication protocol between the scrolling ticker server 40 to UE 12 or UE 14 may, for example, be really simple syndication (RSS), more specifically, the RSS 2.0 standard.

The IMS core 100 communicates with UE 12 and 14. As will be understood by those skilled in the art, the IMS core 100 is described in relevant part with respect to FIG. 2. Those skilled in the art will understand that there may be other components within an IMS core not specifically shown in the drawing. Without limiting the generality of the invention, in order to describe the operation of the peer-to-peer network 10 in the context of this invention, an example will be used in which UE 14 will be assumed to be a wireless device 314 which initiates a communication in a peer-to-peer session with UE 12, assumed in this example to be wireless device 312, when the subscriber associated with wireless device 312 becomes available.

Wireless device 312, upon power-up, registers with the IMS core 100 and the presence server 30, indicating the subscriber of wireless device 312 is online and available for communication. The presence server 30 sends a communication to the scrolling ticker server 40 indicating the availability of subscriber wireless device 312. This communication may be through an ISC interface between the presence server 30 and the scrolling ticker server 40, assuming that the scrolling ticker server 40 is configured as an IMS application server. Alternatively, a SIP interface may be added to the scrolling ticker server 40 to enable communication to proceed between the scrolling ticker server 40 and the presence server 30 through the IMS core 100. There may also be other interfaces that do not traverse the IMS core, again including, but not limited to a SIP interface. Alternatively other protocols utilizing SUBSCRIBE/NOTIFY capabilities may also be implemented. Based on pre-defined criteria on the part of the subscriber of wireless device 314, a message from the scrolling ticker server 40 indicating the presence of wireless device 312 is sent to the subscriber of wireless device 314. The scrolling ticker transmission may, for example, contain a data message indicating that subscriber associated with wireless device 312 is available, or alternatively, it may contain data which includes a pointer which, if selected by the subscriber associated with wireless device 314, offers a one-click invocation of a peer-to-peer session between wireless device 312 and wireless device 314.

Figure 2:
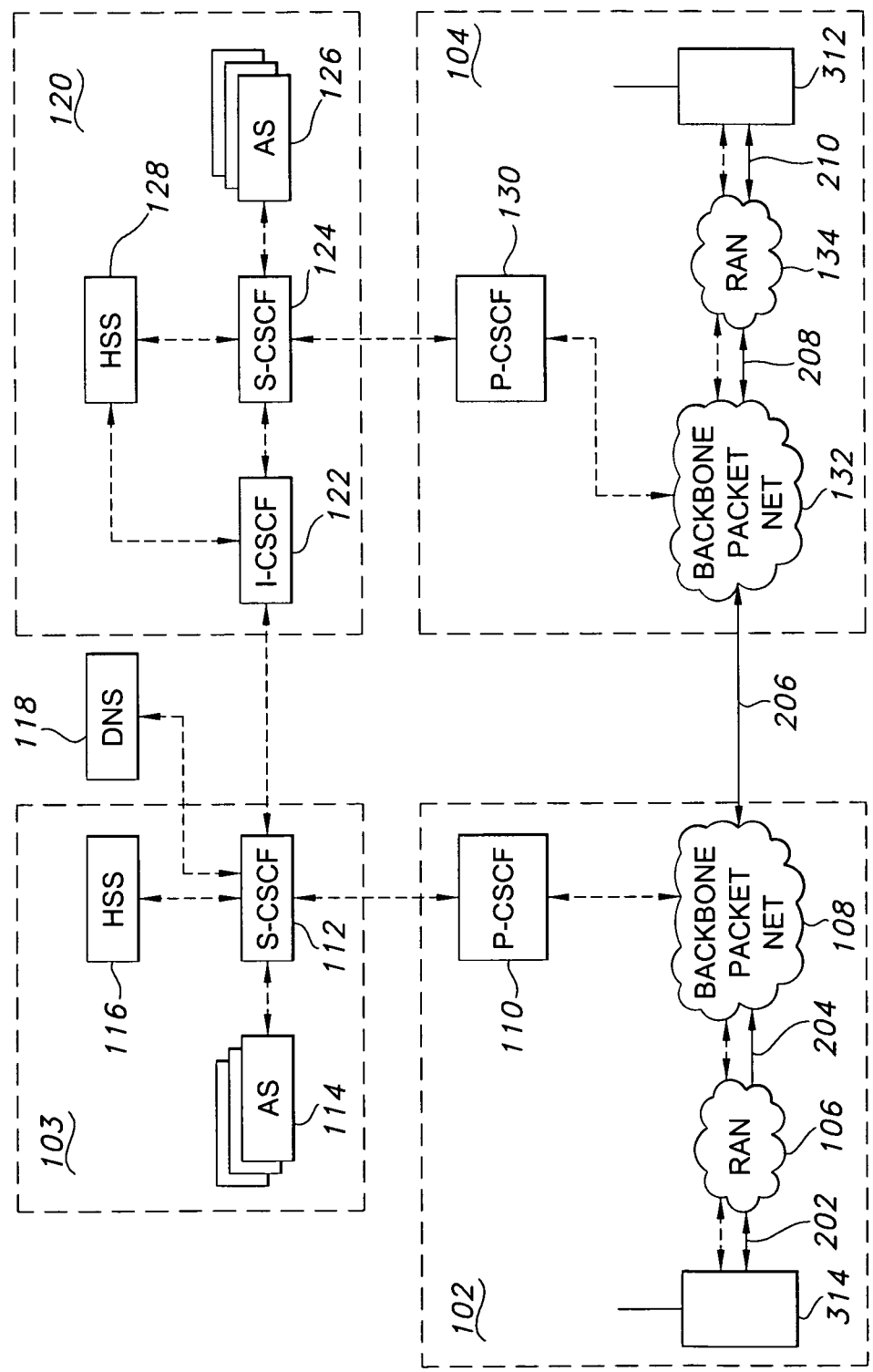
FIG. 2 illustrates an example of the system architecture of an IMS communication system in which peer-to-peer communications occurs.

With reference to FIG. 2, there is shown, by way of example, an embodiment of a peer-to-peer session and protocol between wireless devices 312 and 314. In this example, wireless device 314 is the calling party and wireless device 312 is the called party, and in the context of the present invention, it will be assumed that the subscriber of wireless device 314 has just been notified that the user of wireless device 312 has become available. Dashed lines between elements indicate control signal flow, while solid lines between elements indicate data flow. Wireless device 314 is located within a calling party visited network 102 which will communicate with the calling party home network 103 to authenticate the user of wireless device 314. The calling party home network 103 communicates with the called party home network 120 to locate the wireless device 312 which is found in the called party visited network 104.

The wireless device 314 is connected to the backbone packet network 108 though the radio access network (RAN) interface 106. It will be understood by those skilled in the art that the RAN may, in a GPRS environment, typically contain elements such as the serving GPRS support node (SGSN) and the gateway GPRS support node (GGSN). The packet network 108 may be any type of network, including GPRS, EDGE, CDMA, WCDMA, or any other type of wireless data network. The packet network communicates with the proxy call state control function (P-CSCF) 110 which is typically the first contact point into the IMS core 100 for the wireless device 314. The P-CSCF 110 initiates a SIP session with the serving call state control function (S-CSCF) 112 by issuing a SIP invitation. The S-CSCF 112 communicates with the home subscriber server (HSS) 114 from which the subscriber profile, including permissions and other control parameters, are retrieved. The S-CSCF 112 also communicates with one or more application servers 114 which may, for example, be presence servers or any other type of application server. The S-CSCF 112 also resolves the address destination of the called party home network through DNS server 118.

Continuing with reference to FIG. 2, the peer-to-peer communication setup continues through the S-CSCF communicating with an interrogating call state control function (I-CSCF) 122 within the called party home network 120. The IMS architecture within the called party home network 120 and the called party visited network 104 is similar to that described above in the calling party visited network 102 and the calling party home network 103. The I-CSCF 122 communicates with the S-CSCF 124 within the called party home network 120, which in turn retrieves called party subscriber information from the HSS 128, including the current location of the called party visited network 104 in which subscriber using wireless device 312 is located. The S-CSCF 124 also communicates with any application servers 126 required for operation of various applications. The S-CSCF 124 communicates with the P-CSCF 130 found within the called party visited network 104, through the backbone packet network 130 and RAN 134 to the wireless device 312.

All of the afore-mentioned communications interfaces within the IMS Core 100 relate to control data and are used to set up a peer-to-peer communications session between wireless devices 312 and 314. Once the control is set up, peer-to-peer communications between wireless devices 312 and 314 may occur on bearer channels 202, 204, 206, 208, 210 over which data is transmitted between the wireless device 312 located within the calling party visited network 102 and the called party visited network 104.

It will be understood that variations in the peer-to-peer set-up may exist based on implementation of the network and options selected by the users. For example, upon notification of the availability of wireless device 312, wireless device 314 may initiate the peer-to-peer session via an interactive selection process or alternatively, initiate such a session at some other point in the future. By way of further example, the peer-to-peer session may be initiated automatically with no intervention by wireless device 314, with wireless device 314 will simply be notified via a scrolling ticker message that wireless device 312 has become available and the peer-to-peer session request has been initiated. Yet another example would involve wireless device 312 initiating a peer-to-peer session, either upon registration or on user command, with wireless device 314 being notified via a scrolling ticker message that wireless device 312 has initiated such a session.

It may be that for time sensitive alerts, options whereby such alerts are sent out quickly by obtaining the IP address of the receiving device from the IMS core 100 and then pushed to the scrolling ticker server. Conversely, one of the UEs 12, 14 may periodically poll the presence server 30 to determine the presence status of the other UE, receiving either a positive or negative response via a scrolling ticker message, or a response only when the other UE is present and available. Thus, the invention is adaptable to either "push" or "pull" type of alerts.

Figure 3:
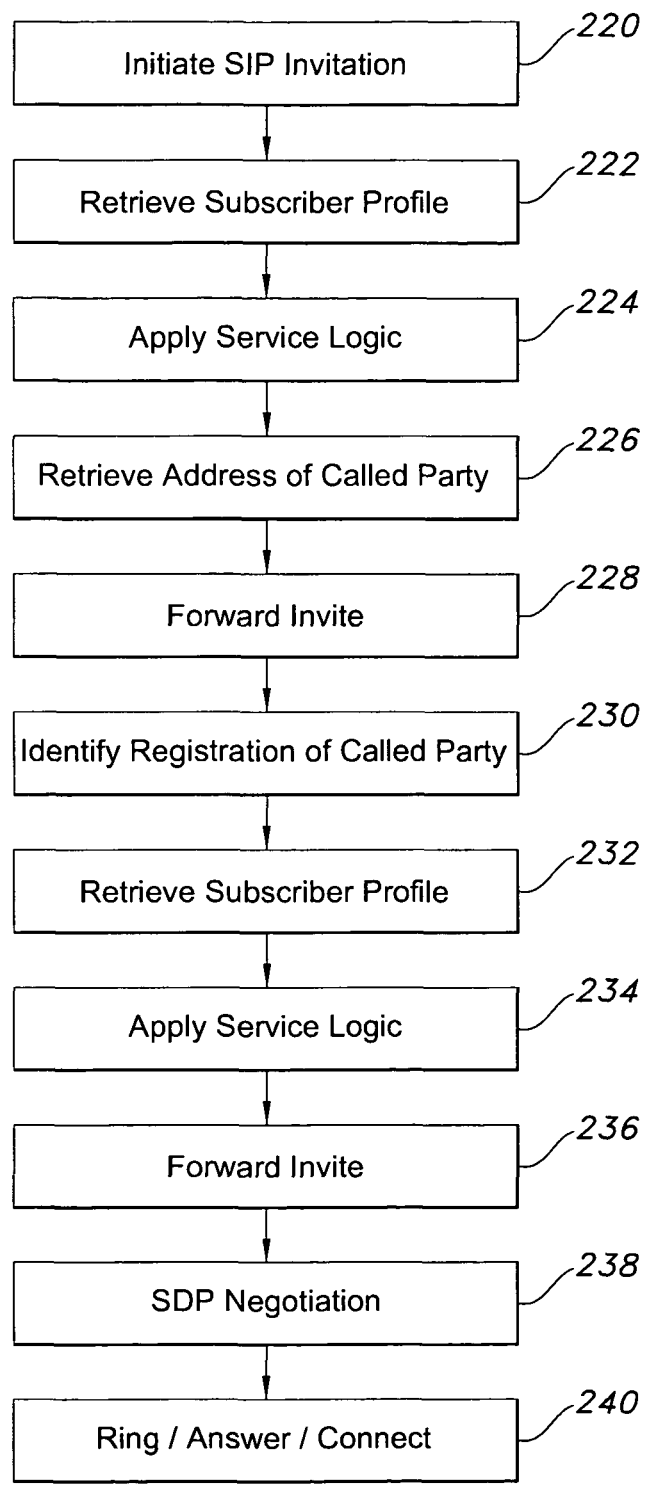
FIG. 3 illustrates a flow chart illustrating the establishment of peer-to-peer communications.

With reference to FIG. 3, there is shown by way of example and not limitation a flow chart that describes the steps taken to establish a peer-to-peer communication session through an IMS core 100 as described in the context of the architecture of FIG. 2. As will be understood by those skilled in the art, variations of these steps are both possibly and likely based on the implementation of the network and user options selected. At step 220, an initiate SIP invitation is generated. At step 222, the subscriber profile of the initiating subscriber is retrieved. At step 224, service logic is applied through access to one or more application servers 114. At step 226, the address of the called party is retrieved from the DNS server 118. At that point, the SIP invite is forwarded at step 228. At step 230, the identity of the registrar of the called party is determined. At step 232, the profile of the called subscriber is retrieved from the HSS 128. At step 234, service logic determined from communication with application servers 126 is applied. At step 236, the invite is forwarded to the called party. At step 238, session description protocol (SDP) negotiations with the subscriber wireless device 312 occur. As will be understood by those skilled in the art, SDP may involve session announcement, session invitation, and other forms of multimedia session initiation. Step 238 is followed by the ring/answer/connect process at step 240.

There are multiple events that could cause a trigger to send a message to subscriber of wireless device 314 via a scrolling ticker message. For example, a triggering event may comprise posting of new content by a subscriber, power-on of a subscriber, login of a subscriber, or signing up for new service by a subscriber. Additionally, trigger events could be periodic or time-based, and could be generated by servers in the network or wireless devices with or without subscriber intervention.

By way of yet another example, alerts may be generated when subscriber using UE 14 attempts a call to the subscriber using UE 12 and UE 14 is busy or otherwise unavailable. Rather than continuing to re-try establishing a call with UE 12, UE 14 may opt to have an alert be scrolled to UE 14 when UE 12 becomes available. That alert may include text only (indicating that the subscriber is available and should be re-dialed), a text message with an embedded pointer to "one click" invocation of a call back, or an automatic generation of a call back signal upon receipt of the scrolling ticker message.

Figure 4:
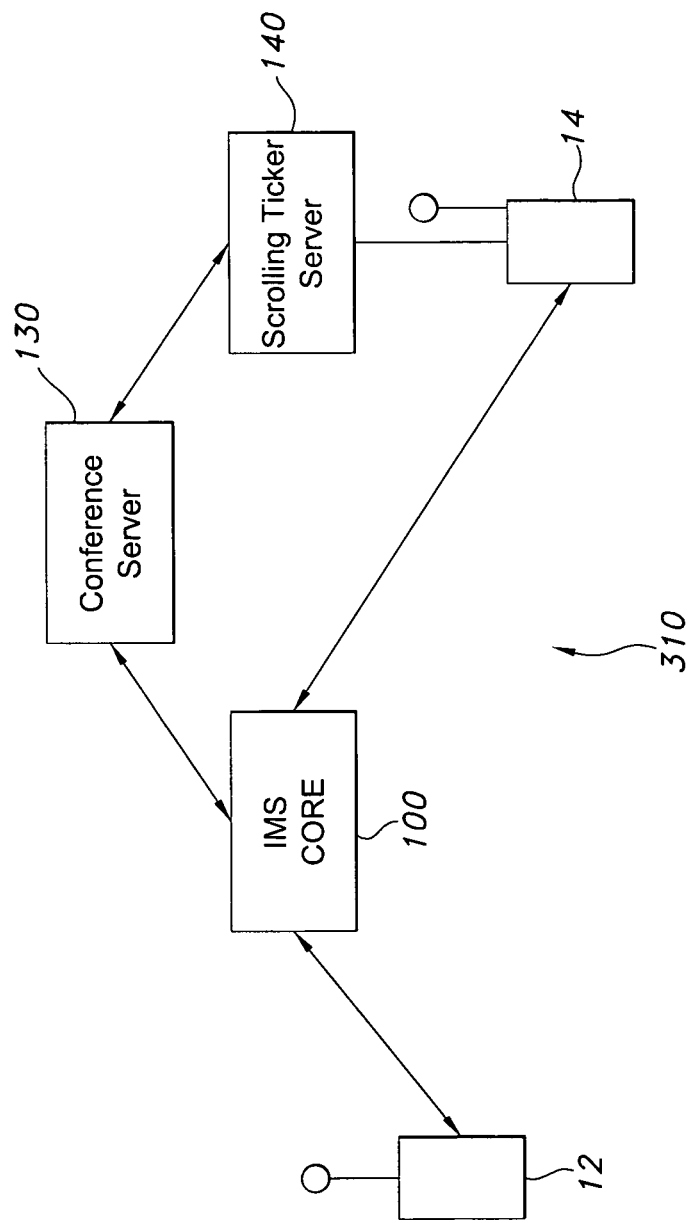
FIG. 4 illustrates an alternative embodiment of the present invention which supports the operation, management and security of conference calling.

With respect to FIG. 4, there is shown an alternative embodiment of the present invention in which instead of a presence server 30, a conference server 130 is attached as an application server to the IMS core 100. In this example, a user may be hosting a conference call. A trigger action may be set up such that when another party joins or leaves the call, the scrolling ticker server will send a message to the host and/or other participants indicating the person who has just joined or left the call. As such, instead of a peer-to-peer network protocol session being initiated, the invention is used to manage access to and participation in a conference call. In this case, there is a conference server (bridge) 130 in the network. The conference server 130 interfaces to the IMS core 100 and the scrolling ticker server 140. The scrolling ticket server 140 operate substantially similar scrolling ticket server 40 with modifications to account for the different network interfaces.

In this embodiment, the scrolling ticker server 140 may, for example, send messages each time a participant connects or disconnects from the conference call. Alternatively, a host of the conference call may use the notification from the scrolling ticker server 140 as a security feature, choosing to admit or deny a would-be conference participant. The notification would be provided through the scrolling ticker server 140 to the wireless device 314. The wireless device 314 may control the access to the conference directly through communication with the IMS core functionality 100.

Thus, there have been described systems and methods for generating alerts to a subscriber using a scrolling ticker server 40 upon the occurrence of certain events and using such alerts for the provision of telecom services. Those skilled in the art will appreciate that numerous changes and modifications can be made to the preferred embodiments of the invention, and that such changes and modifications can be made without departing from the spirit of the invention. An alert may be scheduled for when a previously unavailable party becomes available, thereby generating a scrolling ticker message indicating that party's availability and offering the option to connect either interactively based on the message or automatically with the message serving as notification only. In addition to simply receiving a scrolling text message or a scrolling text message with an embedded pointer, the receiving wireless device may also generate a vibration and/or audible alert based on the content or changes thereto. The selection of such an alert is configurable on the wireless device or based on commands from the network. It is intended, therefore, that the appended claims cover all such equivalent variations as fall within the true spirit and scope of the invention.

What is claimed:

1. A method comprising:
   receiving, by an IP multimedia system core server, a status of a first wireless device, wherein the status comprises information associated with an availability of the first wireless device;
   providing, by the IP multimedia system core server, to a presence server, an indication of the availability of the first wireless device;
   providing, by the presence server, to a scrolling ticker server, the indication of the availability of the first wireless device;
   generating, by the scrolling ticker server, a scrolling ticker message formatted to stream content on a second wireless device in a repeating dynamic scrolling ticker, wherein:
      the scrolling ticker message comprises:
         the status of the first wireless device; and
         an embedded pointer for initiating a peer-to-peer network protocol session between the first wireless device and a second wireless device; and
      clicking the scrolling ticker message invokes a one-click peer-to-peer network protocol session between the first wireless device and the second wireless device via the IP multimedia system core server;
   providing, by the scrolling ticker server, to the second wireless device, the scrolling ticker message; and
   rendering via a repeating dynamic scrolling ticker on the second wireless device, the scrolling ticker message comprising an indication of the first wireless device being powered on or off, an indication of the first wireless device is within coverage range or not within coverage range, an indication of the first wireless device accepting messages or not accepting messages, and an indication of the first wireless device being logged on to an application or not being logged on to an application.

2. The method of claim 1 wherein receiving the status of the first wireless device comprises receiving an alert based on a predefined event.

3. The method of claim 2 wherein the predefined event comprises at least one of powering on the first wireless device, a login to a network or service by the first wireless device, posting of new content by a subscriber, or signing up for new service by a subscriber.

4. The method of claim 1 wherein status of the first wireless device is receiving periodically.

5. The method of claim 1 further comprising receiving an indication of a request from the second wireless device to establish a communication session with the first wireless device.

6. The method of claim 1, further comprising:
   upon the first wireless device becoming available:
      receiving a scrolling ticker alert request for alerting; and
      sending a second scrolling ticker message for triggering an automatic generation of a call back signal.

7. The method of claim 1 wherein the scrolling ticker message is provided upon an indication of a change in the status of the first wireless device being received.

8. A method comprising:
   detecting, by an IP multimedia system core server, an availability of a first device;
   providing, by the IP multimedia system core server, to a presence server, an indication of the availability of the first wireless device;
   providing, by the presence server, to a scrolling ticker server, the indication of the availability of the first wireless device;
   generating, by the scrolling ticker server, a scrolling ticker message formatted to stream content on a second wireless device in a repeating dynamic scrolling ticker, wherein the scrolling ticker message comprises the availability of the first device;
   providing, by the scrolling ticker server, to the second wireless device, the scrolling ticker message;
   rendering via a repeating dynamic scrolling ticker on the second wireless device, the scrolling ticker message, the scrolling ticker message comprising an embedded pointer for connecting the first device to a conference call with a second device, wherein clicking the scrolling ticker message invokes a one-click connection to the conference call, wherein the availability information comprises an indication of the first wireless device is being powered on or off, an indication of the first wireless device is within coverage range or not within coverage range, an indication of the first wireless device accepting messages or not accepting messages, and an indication of the first wireless device being logged on to an application or not being logged on to an application.

9. The method of claim 8, further comprising:
   detecting that a participant of the conference call has disconnected from the conference call;
   generating a second scrolling ticker message comprising a notification that the participant has disconnected from the conference call; and
   providing the second scrolling ticker message.

10. The method of claim 8, wherein receiving the status of the first wireless device comprises receiving an alert based on at least one of powering on the first wireless device, a login to a network or service by the first wireless device, posting of new content by a subscriber, or signing up for new service by a subscriber.

11. A system comprising:
   an IP multimedia system core server for receiving a status of a first wireless device, wherein the status comprises information associated with an availability of the first wireless device;
   a presence server for receiving the status of the first wireless device from the IP multimedia system;

a scrolling ticker server for:
- receiving the status of the first wireless device from the IP multimedia system; and
- generating a scrolling ticker message formatted to stream content in a repeating dynamic scrolling ticker, wherein:
- the scrolling ticker message comprises:
  - the status of the first wireless device; and
  - an embedded pointer for initiating a peer-to-peer communication session between the first wireless device and a second wireless device; and
- clicking the scrolling ticker message invokes a one-click peer-to-peer communication session between the first wireless device and the second wireless device via the IP multimedia system core server; and the second wireless device that renders the scrolling ticker message comprising an indication of the first wireless device being powered on or off, an indication of the first wireless device is within coverage range or not within coverage range, an indication of the first wireless device accepting messages or not accepting messages, and an indication of the first wireless device being logged on to an application or not being logged on to an application.

12. The system of claim 11 wherein:
upon the first wireless device becoming available:
- the scrolling ticker server:
  - receives a scrolling ticker alert request for alerting; and
  - sends a second scrolling ticker message for triggering an automatic generation of a call back signal.

13. The system of claim 11, the IP multimedia further for configured to:
- receiving an indication of a request from the second wireless device to establish a communication session with the first wireless device.

14. The system of claim 11 wherein status of the first wireless device is received periodically.

15. The system of claim 11 wherein a communication path initiated between the first mobile device and the second mobile device is a conference call.

* * * * *

UNITED STATES PATENT AND TRADEMARK OFFICE
CERTIFICATE OF CORRECTION

PATENT NO. : 8,509,853 B1  
APPLICATION NO. : 11/504132  
DATED : August 13, 2013  
INVENTOR(S) : Matthew Wayne Stafford, Mark Steven Wuthnow and William Patrick Coan Page 1 of 1

It is certified that error appears in the above-identified patent and that said Letters Patent is hereby corrected as shown below:

In the Claims

<u>Column 10</u>,
Claim 13,
Lines 10-11, after "further for" delete "configured to".

Signed and Sealed this
Twenty-sixth Day of November, 2013

Margaret A. Focarino
*Commissioner for Patents of the United States Patent and Trademark Office*